US007988560B1

(12) United States Patent
Heller et al.

(10) Patent No.: US 7,988,560 B1
(45) Date of Patent: Aug. 2, 2011

(54) PROVIDING HIGHLIGHTS OF PLAYERS FROM A FANTASY SPORTS TEAM

(75) Inventors: Brian Heller, Vienna, VA (US); Barry Carpe, Jr., Leesburg, VA (US)

(73) Assignee: AOL Inc., Dulles, VA (US)

( * ) Notice: Subject to any disclaimer, the term of this patent is extended or adjusted under 35 U.S.C. 154(b) by 1036 days.

(21) Appl. No.: 11/238,151

(22) Filed: Sep. 29, 2005

Related U.S. Application Data

(60) Provisional application No. 60/645,069, filed on Jan. 21, 2005.

(51) Int. Cl.
*A63F 9/24* (2006.01)

(52) U.S. Cl. .......................................... 463/42; 463/40

(58) Field of Classification Search .................. 463/1, 9, 463/42; 273/88, 94, 85 R; 700/91, 93
See application file for complete search history.

(56) References Cited

U.S. PATENT DOCUMENTS

| | | | | |
|---|---|---|---|---|
| 5,326,104 A | * | 7/1994 | Pease et al. ..................... | 463/18 |
| 2002/0034980 A1 | * | 3/2002 | Lemmons et al. .............. | 463/40 |
| 2003/0054885 A1 | * | 3/2003 | Pinto et al. ...................... | 463/42 |
| 2004/0266535 A1 | * | 12/2004 | Reeves ............................ | 463/42 |
| 2005/0005308 A1 | * | 1/2005 | Logan et al. .................. | 725/135 |
| 2005/0239549 A1 | * | 10/2005 | Salvatore et al. ............... | 463/42 |

OTHER PUBLICATIONS

Blinkx, "The search engine for TV!", reprinted on Jan. 11, 2005 from http://www.blinx.com/overview.php, pp. 1-7.
Blinx, "About blinx", reprinted on Jan. 11, 2005 from http://www.blinx.com/content/about.php, pp. 1-7.
Blinx, "Features", reprinted on Jan. 11, 2005 from http://www.blinx.com/content/features. php, pp. 1-7.
Blinx, "TV search for broadband users", reprinted on Jan. 11, 2005 from http://searchus.blinx.com/BlinxTv/Is.jsp?d=v&btv=true&q=indonesia+tsunami+destriction&x=47&y=15, pp. 1-4.
NFL Fantasy Extra—Fantasy Football Extra Fantasy Football, "NFL Fantasy Extra: The Best Source for Fantasy News and Analysis", reprinted on Jan. 11, 2005 from http://football.nfl.com/splash/football/ffe/mart/index2?vendor=ffe, pp. 1-2.
Major League Baseball: Subscriptions: All Access, "Subscriptions All Access", reprinted on Jan. 11, 2005 from http://mlb.mlb.com/NASApp/mlb/mlb/subscriptions/all_access/features.jsp, pp. 1-3.
Online NewsHour Video Results, "Online NewsHour Video Search", reprinted on Jan. 11, 2005 from http://www.pbs.org/newshour/video, pp. 1-2.
Blinx.tv Finds TV Content Online, "Blins.tv Fins TV Content Online", reprinted on Jan. 11, 2005 from http://clickz.com/news/article.php/3449251, pp. 1-4.

(Continued)

*Primary Examiner* — David L Lewis
*Assistant Examiner* — Eric M Thomas
(74) *Attorney, Agent, or Firm* — Finnegan, Henderson, Farabow, Garrett & Dunner, LLP

(57) ABSTRACT

One aspect of the disclosure allows fantasy-sports league participants to receive video highlights of the players on their fantasy-league team. In at least one implementation, presenting player highlights includes receiving a request from a participant in a fantasy-sports league. The request is for player highlights related to a participant-specified team roster. In response to receiving the request, an identity of at least one player on the participant-specified team roster is accessed electronically. At least one video source having content relating to the identified player is accessed. Specific content within the video source that relates to the identified player is determined, and the specific content is presented to the participant.

33 Claims, 8 Drawing Sheets

OTHER PUBLICATIONS

Searching Television via Closed-Captioning, "Searching Television via Closed Captioning", reprinted on Jan. 11, 2005 from http://blog.searchenginewatch.com/blog/041105-093901, pp. 1-3.

[print version] Striking up digital video search | CNET News.com, "Striking up digital video search", reprinted on Jan. 11, 2005 from http://news.com.com/2102-1032_3-5466491.html?tag=st.util.print, pp. 1-5.

PaidContent.org, "PaidContent.org Newswire: [Jan. 18, 2005]", reprinted on Jan. 21, 2005 from http://paidcontent.org, pp. 1-8.

Google rolls out TV search prototype | CNET News.com, "Google rolls out TV search prototype", reprinted on Jan. 25, 2005 from http://news.com.com/Google+rolls+out+TV+search+prototype/2100-1032_3-5548834.html, pp. 1-5.

Yahoo Expands Video Search, "Yahoo Expands Video Search", reprinted on Jan. 25, 2005 from http://www.eweek.com/article2/0,1759,1754083,00.asp, pp. 1-4.

Blinx, "blinx TV", reprinted on Jan. 11, 2005 from http://www.blinkx.tv/downloads/blinkx_TV_White_Paper_v1.0.pdf, pp. 1-10.

Google steps into TV search, joining rivals—Jan. 25, 2005, "Google to provide video search", reprinted on Jan. 25, 2005 from http://money.cnn.com/2005/01/25/technology/google_video.reut/index.htm?cnn=yes, pp. 1-3.

* cited by examiner

PROVIDING HIGHLIGHTS OF PLAYERS FROM A FANTASY SPORTS TEAM

CROSS REFERENCE TO RELATED APPLICATIONS

This application claims the benefit of U.S. Patent Application Ser. No. 60/645,069, filed on Jan. 21, 2005, and titled "Providing Audio and Video Clips", the entire contents of which are hereby incorporated by reference.

TECHNICAL FIELD

This document relates to identifying and presenting clips used, for example, to highlight players from a fantasy sports team.

BACKGROUND

A participant in a fantasy sports league, such as a fantasy football league, maintains a team of players that participate in games from an actual sports league, such as the National Football League (NFL). A score is attributed to each of the players based on their performances in games of the actual sports league. For example, a player from the participant's team may earn points for the participant's team by scoring points in an actual game. Each participant of the fantasy sports league is ranked based on the aggregate scores of the players in the participant's team. As a result, a participant may desire to monitor the performances of the players that are on the participant's team, for example, by viewing audio or video clips highlighting the included players. However, the players that are on the participant's team may be from multiple teams in the actual league and, therefore, may participate in multiple actual games. Accordingly, manually gathering highlights for each of the players may be burdensome.

SUMMARY

In one general aspect, providing a fantasy-sports-league includes allowing a participant in the fantasy-sports-league to enter a roster of players. Scoring is provided for the participant based on the roster. An event list and the roster are accessed automatically. Video highlights of all players on the roster are presented to the participant. The video highlights depict each of the players participating in events on the event list. An updated roster is received from the participant. Scoring is provided for the participant, after the updating of the roster, based on the updated roster. The updated roster is accessed automatically and video highlights of all players on the updated roster are presented to the participant.

In another general aspect, presenting player highlights includes receiving a request from a participant in a fantasy-sports league. The request is for player highlights related to a participant-specified team roster. In response to receiving the request, an identity of at least one player on the participant-specified team roster is accessed electronically. At least one video source having content relating to the identified player is accessed. Specific content within the video source that relates to the identified player is determined, and the specific content is presented to the participant.

Implementations may include one or more of the following features. For example, receiving a request may include receiving a single click request from the participant. Receiving the request may include receiving an automatic request when the participant logs-in to a website for the fantasy-sports-league, such that in response to the participant logging-in the identity of the player and the video are accessed automatically, and the specific content is determined automatically and presented automatically.

Another player name from the participant may be received. The other player name may not be on the roster. At least one video source having content related to the other player name may be accessed. Specific content within the video source that relates to the other player may be determined, and the specific content relating to the other player may be presented to the participant.

Specific content relating to at least one other player on the roster may be determined and presented. The participant may be presented with specific content relating to multiple players on the roster. The specific content for each of the multiple players may be compiled into a single object such that the participant is presented with a single object including an aggregation of highlights identified relating to all of the multiple players. Compiling may include positioning together all highlights that relate to a common type of event that occurs in a fantasy-sports league. All highlights that show one or more players on the player-specified team roster scoring a touchdown may be positioned together at the beginning of the aggregation.

The specific content may be filtered based on user specified parameters. The specific content presented to the participant may include filtered specific content. The identity of the player may be accessed after the participant updates the roster. The player may be added to the roster during the update. Specific content for only a subset of the players on the roster may be presented to the participant.

An upcoming opponent of the at least one player may be identified. The determined specific content may further relate to the identified upcoming opponent and may include content depicting the at least one player playing against the identified upcoming opponent.

In another general aspect, presenting video highlights of interest from within one or more sporting events includes accessing a predefined set of events related to activities that occur during a sporting event. A user-specified set of game players of interest to the user is accessed. For each of the plurality of game players, the predefined set of events is used as a basis for identifying video content showing the player participating in one of the predefined set of events. The video content is identified from among video relating to one or more game instances. The identified video is presented to the user.

Implementations may include one or more of the following features. For example, accessing a user-specified set of game players may include accessing a user-specified roster. A user may be enabled to modify the predefined set of events.

The video content may be identified based at least on a comparison between events included in the predefined set of events and closed-captioning text associated with searched video. The video content may be identified based at least on a comparison between events included in the predefined set of events and indicia identified through manual review and indexing of video.

In another general aspect, providing video highlights for a fantasy sports-league team roster includes accessing a roster for a team specified by a participant in the fantasy sports-league. Video content that includes content relating to at least one player on the roster is accessed. The video content for the at least one player participating in an event from an events list is searched for. Based on the searching, a portion of the video content that is smaller than the video content. The identified portion depicts the at least one player participating in an event from the events list is identified. The portion is provided to the user.

Implementations may include one or more of the following features. For example, providing the portion to the user may include providing the portion to the user without providing the entire video content.

Identifying the portion of the video content may include extracting the portion from the video content. Providing the portion to the user may include providing only the extracted portion.

In yet another general aspect, presenting player highlights includes receiving a request from a participant in a fantasy-sports league. The request is for player highlights against upcoming opponents related to a participant-specified team roster. In response to receiving the request, an identity of at least one player on the participant-specified team roster is accessed electronically. An identity of at least one upcoming opponent of the identified player is accessed electronically. At least one video source having content relating to the identified player and the identified opponent is accessed. Specific content within the video source that relates to the identified player and the identified opponent is determined, and the specific content is presented to the participant.

Implementations may include one or more of the following features. For example, Specific content relating to at least one other player on the roster and to an upcoming opponent of the at least one other player may be determined and presented. Consequently, the participant may be presented with specific content relating to multiple players on the roster and to one or more upcoming opponents of the multiple players.

The specific content for each of the multiple players may be compiled into a single object. Consequently, the participant may be presented with a single object including an aggregation of highlights identified relating to all of the multiple players and to the one or more upcoming opponents of the multiple players.

These general and specific aspects may be implemented using a system, a method, or a computer program, or any combination of systems, methods, and computer programs.

Other features will be apparent from the description and drawings, and from the claims.

DETAILED DESCRIPTION

A participant in a fantasy sports league maintains a team of players that contribute to the overall score of the participant's team within the fantasy sports league. Audio or video clips highlighting performances of the players may be retrieved for the participants. More particularly, a pre-defined roster of the players is accessed, and highlights are identified for the players included in the roster. A highlight of a player included in the roster may feature the player participating in one of a pre-defined set of events, such as a scoring play or a play in a particular portion of a playing field. Highlights may be provided to the participant on a periodic basis, each time the participant's roster changes, or in response to a request from the participant. The highlights may be presented to the participant individually or in an aggregated format such that the user may evaluate the performances of several selected or rostered players with the highlights.

Figure 1:
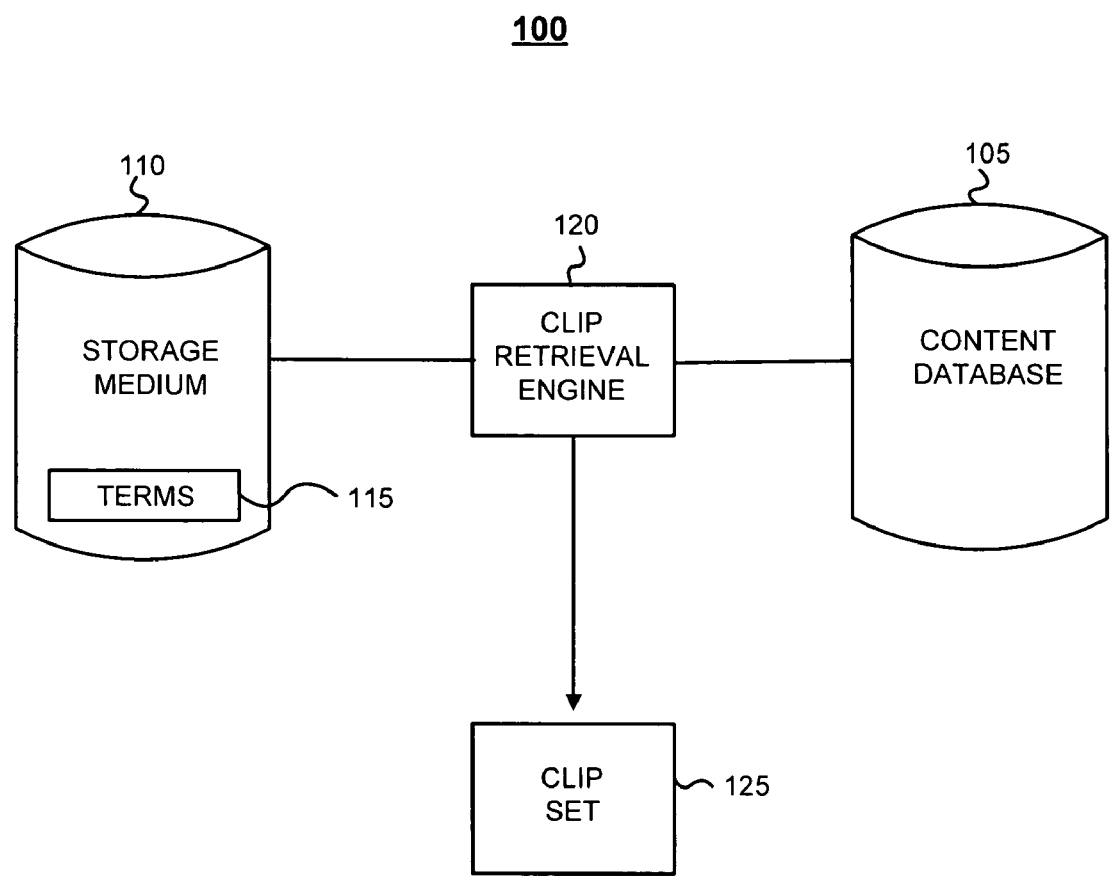
FIG. 1 is a block diagram of a system for providing clips of content related to one or more pre-specified terms.

Referring to FIG. 1, a clip retrieval system 100 is used to retrieve clips from audio or video content that match terms of interest that have been previously specified by a user. The clips are identified from content stored in a content database 105. A storage medium 110 includes a list of terms 115 for which clips are identified. A content retrieval engine 120 identifies and formats the clips into a clip set 125.

The content database 105 includes audio and video content from which clips may be extracted. More particularly, content database 105 includes one or more relatively large pieces of audio or video content from which relatively small pieces of content, also known as clips or sub-content, may be extracted. Examples of audio and video content include televised sporting events, news programs, other television programs, movies, albums, and concerts. The content database 105 may include pieces of content that are exclusively audio or exclusively video. Alternatively or additionally, the content database 105 may include pieces of content that combine audio content and video content. The content database 105 also may include metadata that describes the subject matter and characteristics of the audio and video content, such as closed captioning information. The audio and video content are described in further detail below with respect to FIG. 3. Some implementations of the clip retrieval system 100 may include multiple content databases, and each of the content databases may include a particular type of audio or video content. For example, one content database may include television programs, and another content database may include movies. Clips may be retrieved from content included in particular ones of the multiple content databases. In one implementation, the content database 105 may represent one or more specialized databases of audio or video content, and each of the specialized databases may include particular audio or video content, such as television programs, movies, sporting events, or highlight reels of sporting events. In another implementation, the content database 105 may represent the Internet as a whole, and the audio or video content included in the content database 105 may include audio or video content that is publicly accessible from the Internet. In yet another implementation, the content database 105 may include one or more specialized databases and the Internet as a whole.

The content database 105 and the storage medium 110 each may be persistent storage, transient storage, or a combination of persistent and transient storage. The content database 105 and the storage medium 110 may represent fixed or removable storage media. The content may be stored within the content database 105 as, for example, one or more database tables, or as one or more files. Similarly, the terms list 115 may be stored within the content database as one or more database tables, or as one or more files.

The terms list 115 includes one or more terms of interest to a user. The terms of interest may represent terms for which matching clips are identified. For example, the matching clips may feature one or more entities identified by the terms in the terms list 115. As another example, the matching clips may cover subject matter identified by one or more terms in the terms list 115. In one implementation, the terms list 115 is a list of players from a team that is maintained by the user within a fantasy sports league for any sport at any level, such as, for example, a fantasy football league, a fantasy baseball league, a fantasy basketball league, a fantasy hockey league, or a fantasy auto racing league. The fantasy sports league may represent any level, such as, for example, college, professional, or minor leagues, at any division therein for men and/or women. In another implementation, the terms list may be a list of favorite actors, musicians, or other entertainers. In yet another implementation, the terms list may be a list of favorite television programs, movies, or albums of the user. Implementations also may use terms of different types, such as people and events. In some of the above implementations, the terms list 115 may include or represent multiple terms lists. For example, in implementations where the terms list 115 is a roster of players from a fantasy sports team, the terms list 115 may include a list of starting players on the team, a list of backup players on the team, a list of players that play a particular position, and other lists including a subset of the players included in the team. Thus, a given participant in a fantasy sports league may have multiple terms lists.

The terms list 115 may be maintained and therefore used repeatedly for clip retrieval. Therefore, the user is not required to specify the terms list 115 repeatedly (i.e., each time clips that match the terms included in the terms list 115 are to be retrieved). Instead, the user may quickly and easily indicate that clips are to be retrieved by selecting a single option for retrieving clips that match constituent terms within a terms list 115 previously established. In other words, the user may submit a request for the clips with one or a small number of actions. The user also may designate a default setting in which the clips are retrieved and/or made perceivable automatically (e.g., upon a log-in) or periodically (e.g., once a week). The user also may indicate that clips are to be retrieved and/or made perceivable each time new clips for the terms in the terms list 115 are available. For example, a link to the new clips may be sent to the user without the user actively indicating that the new clips should be identified. Retrieving the clips in such a manner provides a streamlined and seamless interaction for the user. The user may easily and automatically be presented with a default set of personalized clips without manually expending a large amount of effort to identify, organize, and view the clips The clip retrieval engine 120 retrieves clips that match terms from the terms list 115 from the content stored in the content database 105. The clip retrieval engine 120 accesses the terms list 115 from the storage medium 120. In one implementation, the clip retrieval engine 120 may use an external search engine to identify the clips from the content included in the content database 105. In such an implementation, the clip retrieval engine 120 may provide the external search engine with the terms list 115. The external search engine may identify the clips based on analysis of the content and other information describing the content that may be associated with the content. In other implementations, the clip retrieval engine 120 may identify the clips itself based on analysis of the content and the corresponding metadata.

The clip retrieval engine 120 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The clip retrieval engine 120 may receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the clip retrieval engine 120.

The clip retrieval engine 120 produces the clip set 125 for presentation to the user. The clip set 125 includes the clips that have been identified as matching the terms included in the terms list 115. The clips may be included in the clip set 125 separately and individually such that each of the clips may be selected individually for presentation. Alternatively, the clips may be included in the clip set 125 as a single object representing an aggregated form of the clips, which enables all of the clips to be presented to the user in response to a single action. The single object may be, for example, a single file or a single stream.

The clip set 125 also may include additional information that enables identification of the clips, and that enables navigation between the clips. For example, for each clip, the additional information may identify the subject matter and characteristics of the clip, as well as one or more terms from the terms list 115 that match the clip. Such information may enable the user to select particular ones of the clips that are of most interest to the user for presentation. Particularly in implementations where the clips are aggregated into a single piece of content within the clip set 125, the additional information may identify boundaries between the clips such that the user is not required to watch all of the clips in the order in which the clips are included in the clip set.

In one implementation, the additional information takes the form of a playlist that identifies the clips within the clip set 125. Each entry in the playlist may identify one of the clips, and selection of an entry from the playlist may cause a corresponding clip to be presented to the user. When the clips are included separately in the clip set 125, each entry may correspond to one of the individual clips. When the clips are aggregated within the clip set 125 within a larger piece of content, each entry may index into a particular point within the larger piece of content at which the corresponding clip begins. Therefore, the user may select entries of the playlist to control an order in which the clips are presented, as well as to control an amount of the clip set 125 that is presented. Furthermore, the user may control an amount of each clip within the clip set 125 that is presented by selecting an entry from the playlist while the clip is being presented, which causes playback the clip to be preempted by playback of a clip corresponding to a selected entry of the playlist.

In one implementation, the clip retrieval engine 120 may transfer the entire clip set 125 to a user interface with which the clips may be presented to the user as one or more discrete files. As a result, the copies of the clips that are local to the user interface may be presented to the user. In another implementation, the clip retrieval engine 120 may transfer only the additional information, such as the playlist, to the user interface, and the clip retrieval engine 120 may stream the clips to the user interface as one or more streams in response to user interaction with the additional information. For example, when the user selects an entry from the playlist, the clip retrieval engine 120 may stream a corresponding clip to the user interface such that the user interface may present the clip to the user. The clip set 125, or the parts thereof, may be transferred to the user interface as one or more files, one or more e-mail messages, one or more instant messages, or one or more web pages.

The components of the clip retrieval system 100 may be connected by one or more networks, such as the Internet, the World Wide Web, wide area networks, (WANs), local area networks (LANs), analog or digital wired and wireless telephone networks (e.g. a public switched telephone network (PSTN), an integrated services digital network (ISDN), or a digital subscriber line (xDSL)), radio, television, cable, satellite, and/or any other delivery mechanism for carrying data. The components of the clip retrieval system 100 may be connected to the one or more networks through communications pathways that enable communications through the one or more networks. Each of the communication pathways may include, for example, a wired, wireless, cable or satellite communication pathway, such as a modem connected to a telephone line or a direct internetwork connection. The components of the networked computing system 100 may use serial line internet protocol (SLIP), point-to-point protocol (PPP), or transmission control protocol/internet protocol (TCP/IP) to communicate with one another over the one or more networks through the communications pathways.

Figure 2:
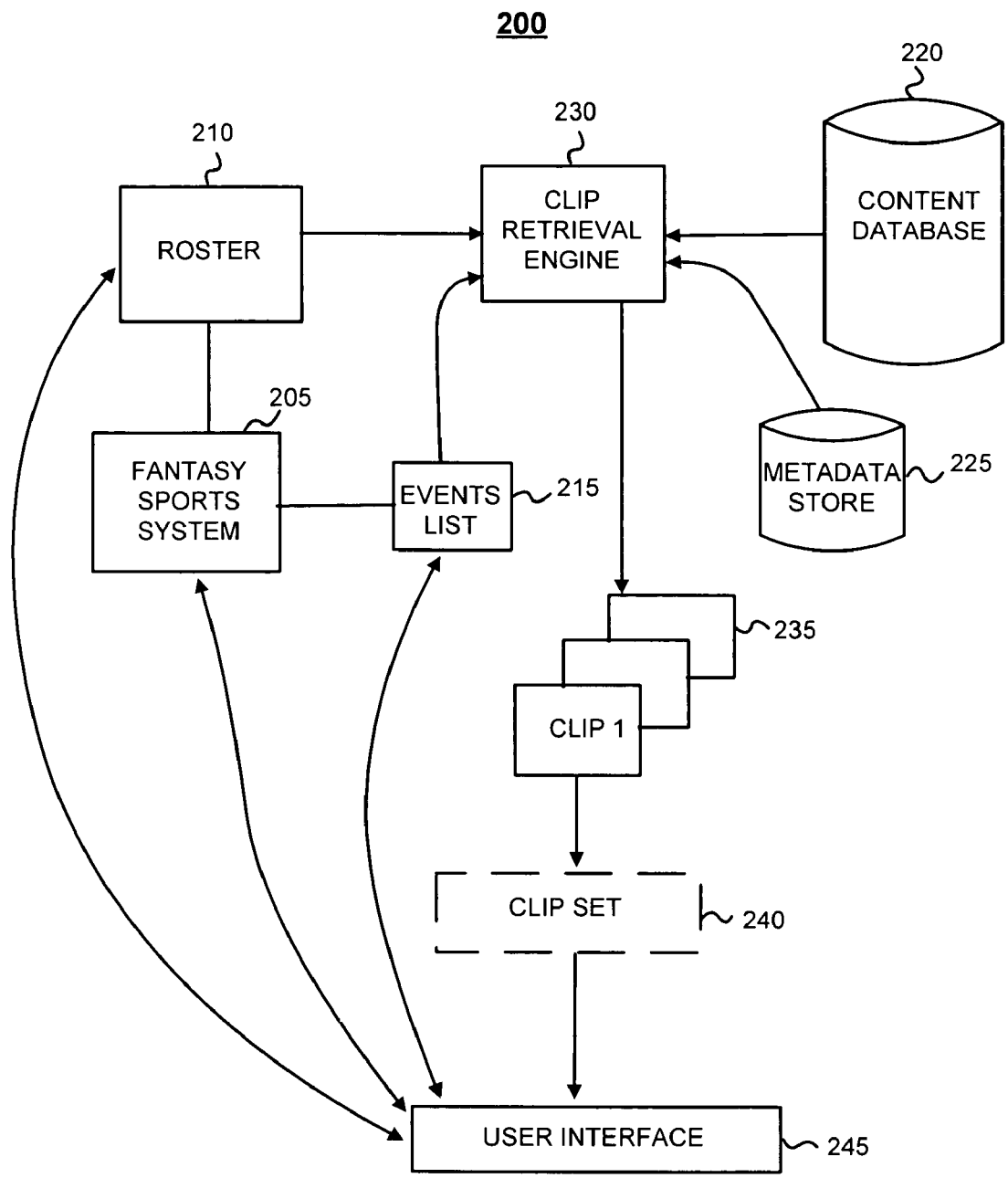
FIG. 2 is a block diagram of a system for providing clips highlighting players included in a team from a fantasy sports league.

Referring to FIG. 2, sports-related clip retrieval system 200 is similar to the clip retrieval system 100 of FIG. 1. The clip retrieval system 200 is used to retrieve clips highlighting players from a team maintained by a user within a fantasy sports league. The clip retrieval system 200 includes a fantasy sports system 205 that operates the fantasy sports league. A roster 210, an events list 215, content database 220, and a metadata store 225 are used by a clip retrieval engine 230 to identify clips 235 from which a clip set 240 may be created. The clip set may be presented to the user with a user interface 245.

The fantasy sports system 205 operates the fantasy sports league in which the user participates. For example, the fantasy sports system 205 may operate a fantasy football league, a fantasy baseball league, a fantasy basketball league, a fantasy hockey league, or a fantasy NASCAR league. The fantasy sports system 205 assigns scores to the team maintained by the user based on performances of players included in the team. The fantasy sports system 205 also enables the user to modify the team. For example, the fantasy sports system 205 may enable the user to change which players are included in a starting lineup for the team. The fantasy sports system 205 also may enable the user to add players to the team, remove players from the team, or trade players for other players from teams maintained by other users of the fantasy sports system 205. The players included in the teams of the fantasy sports league operated by the fantasy sports system 205 may represent any type of player, such as college players, professional players, minor league players, international league players, men, or women.

The roster 210 may represent one implementation of the terms list 115 of FIG. 1, or may represent a component part of the terms list 115. The roster 210 includes a list of players included in the team maintained by the user for the fantasy sports system 205. Clips highlighting the players included in the roster 210 are identified by the clip retrieval engine 230. The user specifies the roster 210 once, though the user may modify the roster 210 through manipulation of the user interface 245, either directly or through the fantasy sports system 205. The user also may modify the roster 210 using a wireless communications device, such as a cellular telephone or a personal digital assistant (PDA) with wireless communications capabilities either directly or through the fantasy sports system 205. The user may modify the roster 210 with the wireless communications device when the user may not access the user interface 245, for example, due to time constraints, such as a deadline for roster changes. The user may modify the roster 210, for example, by trading players included in the roster 210, by changing the positions of the players included in the roster 210, or by moving players into and out of the starting lineup. The modifications to the roster 210 may be made in response to injuries to one or more of the players. The user, however, typically does not completely re-specify the roster 210.

The events list 215 is a list of events that may be of interest to the user. In other words, when one of the players included in the user's roster 210 is involved in an event included in the events list 215, a clip highlighting the player's participation in the event may be identified for presentation to the user. For fantasy sports, events may be identified based upon their resultant impact on a user's overall score. For instance, in implementations where the fantasy sports league is a fantasy football league, a touchdown, a field goal, an extra point, a two-point conversion, a safety, a play in which at least a threshold number of yards were gained, a turnover, and a sack may be included in the events list 215. The events list 215 may be specified by the fantasy sports system 205. Alternatively or additionally, the events list 215 may be specified manually by the user through the user interface 245, by another user, or by a system administrator of the fantasy sports system 205. The events list 215 and the roster 210 also may be stored together as a terms list.

The content database 220 is similar to the content database 120 of FIG. 1. The content database 220 includes audio and video content relating to sporting events in which the players from the roster 210 participate. For example, the content database 220 may include recordings of entire games in which the players participate. Alternatively or additionally, the content database 220 may include highlight reels of the games in which the players participate.

A metadata store 225 includes information describing the information included in the content database 220. For example, the metadata store 225 may include box scores for the games included in the content database 220. The box score for a recorded game may identify when one or more of the events listed in the events list 215 occurred within the game. In other words, the box score may serve as an index into the games for the significant events for which clips may be extracted. The box score also may include information describing the events, such as players involved in the events and times at which the events occurred. Therefore, the box score may indicate whether a clip highlighting a particular event should be extracted for the user. The box score may be created as the game is recorded or as the recorded game is reviewed. The box score may come, for example, from a newspaper, or an online web site.

The metadata store 225 also may include other textual descriptions of plays or events within the games. For example, the metadata store 225 may include a textual play-by-play description of a game that may be searched to identify significant events that occurred within the game. In other words, the play-by-play description of the game may be processed to produce a box score or another similar piece of information that may be used to identify significant events within the game, and corresponding clips. In some implementations, the metadata store 225 may be included in the content database 220.

The clip retrieval engine 230 is similar to the clip retrieval engine 120 of FIG. 1. The clip retrieval engine 230 retrieves the clips 235 from content included in the content database 220 that highlight players from the roster 210 when the players are involved in events included in the events list 215. Clips may be retrieved for one, some, or all players included in the roster 210. For example, clips may be retrieved for the starters, the bench players, the stars, or other subsets of the players included in the roster 210. In addition, the clip retrieval engine 230 may retrieve clips representing one, some, or all of the events included in the events list 215. For example, in implementations where the fantasy sports league is a fantasy football league, clips may be retrieved only when a player included in the roster 210 scores a touchdown, even though the events list 215 identifies other events for which clips are to be retrieved. The user may be enabled to select the players from the roster 210 and the events from the events list 215 for which clips are to be retrieved once or each time the clips are to be retrieved. The clip retrieval engine 230 may retrieve the clips 235 when the user logs into the fantasy sports system 205, or each time the user modifies the roster 210.

The clips 235 may be identified based on analysis of the content included in the content database 220. Alternatively or additionally, the clips 235 may be identified based on information included in the metadata store 225. The clips 235 may be identified directly by the clip retrieval engine 230, or by an external search engine accessed by the clip retrieval engine 230.

The clips 235 may be filtered such that the clips 235 do not include a particular clip multiple times, for example, when the event depicted in the particular clip highlights multiple players included in the roster 210. The user may not want that clip to appear twice. For example, if Peyton Manning and Marvin Harrison are both on the user's roster 210, clips highlighting touchdown throws from Manning to Harrison may be included only once instead of twice as separate highlights for both Manning and Harrison.

The clips 235 also may be filtered based on a number of clips that have been identified, or on the total time required for playback of the clips 235. For example, one or more of the clips 235 may be removed when more than a threshold number of clips have been identified, or when the playback time of the clips 235 is greater than a threshold time. For example, the number of clips 235 that were identified for the full roster 210 may exceed the threshold number. As a result, the clips 235 may be filtered to highlight only a quarterback from the roster 210, but the number of the clips 235 still may be too large. The clips 235 may be further filtered to include only clips highlighting touchdown passes of the quarterback or highlights from a most recent game of the quarterback.

Before filtering the clips 235, the clip retrieval engine 230 may identify one or more filtering options, as well as clip counts and playback times of the clips 235 if the filtering options were used to filter the clips 235. The user may be enabled to select one of the filtering options, and the clips 235 may be filtered according to the selected filtering option. For example, the clips 235 may be identified for all players included in the roster 210 and for all events included in the events list 215. As a result the clips 235 may have a total playback time of one hour. The clip retrieval engine 230 may indicate that clips highlighting running backs running for more than a threshold number of yards have a total playback time of 4 minutes and that clips highlighting quarterbacks throwing touchdown passes have a total playback time of 15 minutes. The user may select the clips highlighting running backs running for more than the threshold number of yards, and the clips 235 may be filtered to include only those clips. The filtering options may be identified based on processing of metadata associated with the clips 235, other information relating to the clips 235, and popular filtering options commonly selected by users.

The clip retrieval system 230 may format the clips into the clip set 240 that is similar to the clip set 125 of FIG. 1. The clips 235 may be ordered within the clip set 240 based on a perceived importance or subject matter. For example, clips highlighting a player that scored a higher number of points for the user's fantasy sports team may be included in the clip set 240 before clips highlighting a player that scored a smaller number of points. As another example, clips highlighting a star player from the roster 210 may be included in the clip set 240 first, and clips highlighting other players may be included in the clip set 240 later. In addition, clips highlighting more important events, such as touchdowns, may be included in the clip set 240 before clips highlighting less important events, such as field goals. Furthermore, clips highlighting plays in which a larger number of yards were gained may be included in the clip set 240 before clips highlighting plays in which a smaller number of plays were gained. More particularly, long touchdown plays may be included in the clip set 240 before short touchdown runs. Such orderings may be combined, for example, such that clips highlighting all touchdowns are included in the clip set 240, in order of length, before any clips highlighting field goals are included in the clip set 240. The clip retrieval system 230 may transfer the clips 235, which do not include additional information, or the clip set 240 to the user interface 245.

The clips 235 or the clip set 240 may be presented to the user using the user interface 245. The user interface 245 may include a display, such as a monitor, flat screen display, a touch screen, or a projector, with which video content included in the clips 235 or the clip set 240 may be presented to the user. The user interface 245 also may include speakers with which audio content included in the clips 235 or the clip set 240 may be presented to the user. The user interface 245 also may include one or more input devices, such as a keyboard, a mouse, a stylus, or a microphone, that the user may use to navigate among the clips 235 and to interact with the clip set 240. The user interface 245 also may enable the user to interact with the fantasy sports system 205 and to modify the roster 210 and the events list 215. The user interface 245 also may be configured to present addition information associated with the clips 235 or the clip set 240 to the user. For example, the user interface 245 may present statistics for a player visually or audibly while a clip highlighting that player is being presented. As another example, metadata describing the clips 235 or the clip set 240 may be presented to the user. For example, the user interface 245 may present a title, a singer, and a songwriter of a song from which a clip is being presented to the user.

The user interface 245 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The user interface 245 may receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the user interface 245. The user interface 245 also may be another device on which the clips 235 or the clip set 240 may be presented, such as a television with additional components for receiving and processing user input.

The user interface 245 also may enable the user to specify one or more additional players not included in the roster 210 for which clips are to be retrieved. The additional players may represent free agents that may be added to the roster 210, or players that have scored more than a threshold number of points in one or more previous games. As long as the additional players are not included in the roster 210, the user uses the user interface 245 to manually specify the additional players each time clips are to be retrieved for the additional players. Clips for the additional players are identified by the clip retrieval engine 230 in a similar manner as the clips for the players included in the roster 210.

The clip retrieval system 200 may be used after the players included in the roster 210 participate in actual games. In addition, the clip retrieval system 200 may be used to retrieve clips for players at other times. For example, the clip retrieval system 200 may be used to retrieve highlights of players included in a set of players that are not included in the roster 210. More particularly, when the user is drafting the team represented by the roster 210, clips may be retrieved for candidate players, allowing the user to use the clips to determine which of the candidate players should be included in the roster 210.

As another example, a player from the roster 210 may be playing against a particular team in an upcoming game. Clips may be retrieved highlighting the player's performance in previous games against the particular team such that the user may see how the player has performed historically against the particular team. The user may use such information to determine whether the player should be started in the upcoming game, or whether the player should be removed from the roster 210 before the upcoming game.

In addition to video highlights of the player's performance in previous games against the particular team, statistics describing the player's performance also may be presented to the participant. For example, statistics describing the player's performance in the last one, three, and/or another number of previous games against the particular team may be presented to the participant. The statistics may include a number of points that the player scored for the user's fantasy sports teams in the previous games. The statistics also may include an indications other statistics of the player for the previous games. For example, if the player is a quarterback, the statistics may include an indication of a number of completed passes, a number of attempted passes, a number of yards gained, a number of touchdown passes thrown, and a number of interceptions thrown by the player in the previous games. The statistics also may help the user to determine whether the player should be started in the upcoming game, or whether the player should be removed from the roster 210 before the upcoming game.

Figure 3:
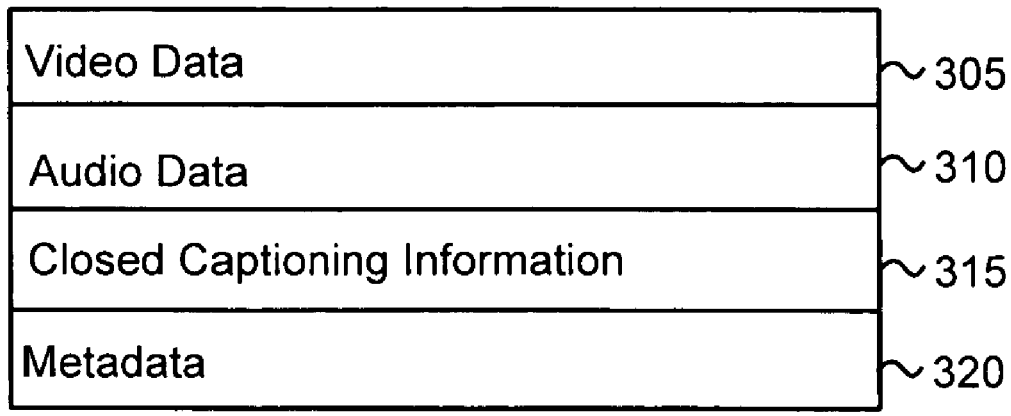
FIG. 3 is a block diagram of content from which clips may be identified.

Referring to FIG. 3, clips are identified from content 300, which is stored in a content database, such as the content database 120 of FIG. 1 or the content database 220 of FIG. 2. The content 300 includes video data 305, audio data 310, closed captioning information 315, and metadata 315. A content database need not include all four of these types of content to be used in various implementations.

The video data 305 and the audio data 310, individually or together, represent content from which clips may be extracted. For example, the video data 305 and the audio data 310 may represent a televised sporting event, a news program, another television program, a movie, a piece of music, an album, a concert, or another recording of audio and video. In implementations where the video 305 and the audio 310 collectively represent a piece of content, the video data 305 or the audio data 310 may include synchronization information that enables the video data 305 to be synchronized with the audio data 310.

The video data 305 may include identifiable text or objects that may be indicative of subject matter or characteristics of the video data 305 and the audio data 310. For example, in implementations where the video data 305 relates to a sporting event, the video data 305 may include an identifiable indication of a score of the sporting event (in the upper left or right-hand corner of an image, for example), which may be monitored for changes. A change in the indication of the score may signify that a significant event has occurred recently, and a clip of the significant event may be extracted from the video data 305 and the audio data 310. As another example, a particular portion of a playing field in which teams typically score points (e.g., the "red zone" of a football field, or the area within 20 yards of an opponent's end zone) may be identified from the video data 305. A clip of the video data 305 and the audio data 310 may be extracted when the particular portion is recognizable because points may be scored while the portion is recognizable. Further, for example, particular jersey numbers and team logos may be searched for within the video data 305. Alternatively or additionally, the video data 305 and the audio data 310 may be indexed at one of these particular portions to allow, for example, later extraction.

The audio data 310 may include play-by-play commentary for the sporting event. Therefore, the audio data 310 may include indications of significant events from the sporting event when the commentary addresses the significant events. The audio data 305 may be processed (with speech recognition, for example) and recognized to determine when the commentary addresses the significant events. A clip of the video data 305 and the audio data 310 may be extracted when the audio data 310 is determined to be addressing a significant event. Alternatively or additionally, the video data 305 and the audio data 310 may be indexed at one of these significant events.

The closed captioning information 315 may include text that may be displayed with the video data 305 and the audio data 310. The text may represent words that are spoken when the audio data 310 is presented. The closed captioning information 315 also may include time information that may be used to synchronize the text with the video data 305 and the audio data 310. A portion of the text may be analyzed to identify a subject matter or characteristics of a portion of the video data 305 or the audio data 310 that correspond to the portion of the text. For example, when the video data 305 and the audio data 310 relate to a football game, the closed captioning information 315 may include the word "touchdown." As a result, it may be determined that the video data 305 and the audio data 310 depict a touchdown being scored near a time corresponding to the word "touchdown" in the closed captioning information 315. Clips may be extracted from the video data 305 and the audio data 310 based on the subject matter or characteristics identified with the closed captioning information 315. Using the example from above, a clip of a touchdown being scored may be extracted from the video data 305 and the audio data 310 by extracting a portion of the video data 305 and the audio data 310 that spans the time corresponding to the word "touchdown" in the closed captioning information The metadata 320 includes information describing the video data 305 and the audio data 310. More particularly, the metadata 320 may include indexing information that separates the video data 305 or the audio data 310 into multiple pieces. For example, the audio data 310 may represent multiple songs, or multiple sections of a single song, and the metadata 320 may be used to identify the multiple songs or sections of a song within the audio data 310. Similarly, the video data 305 may represent multiple programs, or multiple sections of a single program, and metadata 320 may be used to identify the multiple programs or sections of a program within the video data 305. The metadata 320 also may include information describing events within the video data 305 and the audio data 310. For example, in implementations where the video data 305 and the audio data 310 relate to a sporting event, the metadata 320 may identify when a team involved in the sporting event scores. The metadata 320 also may include details of the scoring event, such as an indication of a player from the team that scored and a time at which the team scored.

Figure 4:
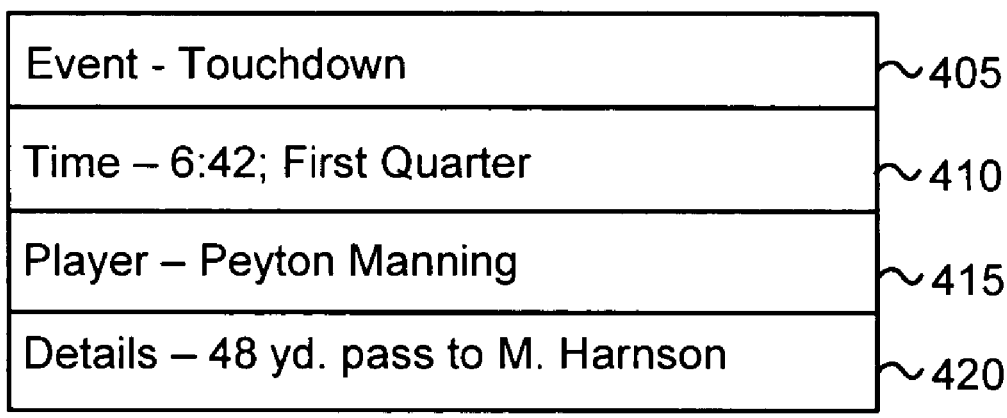
FIG. 4 is a block diagram of metadata that may be used to describe, characterize, and/or identify clips from a piece of content.

Referring to FIG. 4, metadata 400 describes audio or video content from which clips may be extracted. More particularly, the metadata 400 identifies events within the audio and video content for which clips may be extracted. As a result, one or more pieces of the metadata 400 may be used to search for the events within the audio and video content. The metadata 400 may be associated with the audio or video content, as is the case for the metadata 320 of FIG. 3. Alternatively or additionally, the metadata 400 may be found in an external store of metadata, such as the metadata store 225 of FIG. 2. Examples of metadata include, for example, a box score.

The implementation of the metadata 400 illustrated in FIG. 4 corresponds to audio and video content from a sporting event. As a result, the metadata 400 includes an event field 405, a time field 410, a player field 415, and a details field 420. The fields 405-420 may be formatted individually as independent fields, or collectively as a single piece of searchable text. In one implementation, the metadata 400 may be a box score for the sporting event.

The event field 405 identifies an event of interest within the audio and video content. For example, in the football-related metadata 400 illustrated in FIG. 4, the event field 405 indicates that a touchdown has occurred. Other football-related events that may be identified within the event field 405 include a field goal, an extra point, a two-point conversion, or a safety. The event field 405 also may identify a play in which at least a particular number of yards were gained, a turnover, a sack, or another significant event. In general, the event field 405 identifies a significant event within the audio and video content that may relate to one or more players for whom clips are being identified. The event identified in the events field may be an event included in a list of significant events, such as the events list 215 of FIG. 2.

The time field 410 indicates a time at which the event identified in the event field 405 occurred. In one implementation, the time field 410 may identify the time within the sporting event represented by the audio and video content at which the event occurred. For example, in the football-related metadata 400 of FIG. 4, the time field 410 indicates that the touchdown identified by the event field 405 occurred with 6:42 left in the first quarter. In another implementation, the time field 410 may indicate an absolute time at which the event occurred. For example, the time field 410 may indicate that the event occurred at 3:15 P.M. on Sunday, Feb. 1, 2004.

Implementations may use the time information in the time field 410 to index into the audio and video content. For example, the time indicator of 6:42 in the first quarter may be used to search for 6:42 in a visual overlay of a football game (usually in an upper corner of the screen). This allows the 48 yard pass play to be indexed in the game's video.

The player field 415 identifies one or more players that were involved in the event identified in the event field 405. For example, in the football-related metadata 410 of FIG. 4, the player field 415 indicates that Peyton Manning was involved in the touchdown identified by the event field 405.

The details field 420 includes additional information further describing the event identified by the event field 405. More particularly, the details field 420 may include information describing how the one or more players listed in the player field 415 are involved in the event identified in the event field 405. For example, in the football-related metadata 410 of FIG. 4, the details field 420 indicates that Peyton Manning, who is listed in the player field 415, was involved in the touchdown identified by the event field 405 by throwing a 48 yard pass to M. Harrison.

Other implementations of the metadata 400 may relate to other types of audio and video content. As a result, one or more of the fields 405-420 may be modified or deleted, and additional fields may be added. For example, when the audio and video content represents a concert, the player field 415 may be replaced with a musician field. Furthermore, the event field 405 may identify different types of events, such as solos. In general, the metadata 400 includes any information specifying and describing events within the audio and video content.

Figure 5:
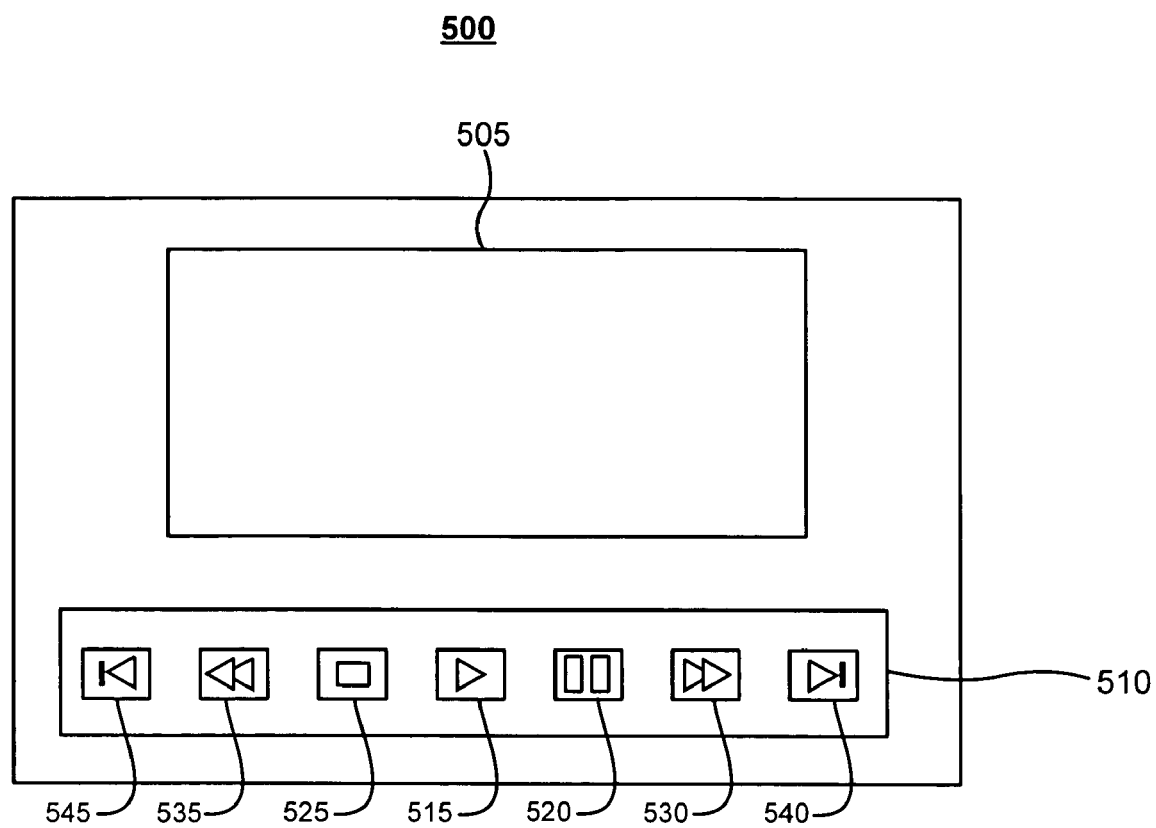
FIG. 5 is an illustration of a user interface for presenting clips.

Referring to FIG. 5, a user interface 500 may be used to present audio or video clips to a user. More particularly, the user interface 500 may be used to present a set of clips, such as the clips 235 of FIG. 2, or a clip set, such as the clip set 125 of FIG. 1 or the clip set 240 of FIG. 2. The user interface 500 enables navigation between the clips such that the user may control a manner in which the clips are presented. The user interface 500 may use additional information provided with the clips or the clip set, such as a playlist, to enable navigation between the clips. The user interface 500 may represent an implementation of the user interface 245 of FIG. 2.

The user interface 500 includes a video display 505 in which video clips are presented to a user. The user interface 500 also includes a control set 510 that may be used to navigate through the clips. For example, a play button 515 may be used to begin playback of the clips, a pause button 520 may be used to temporarily pause playback of the clips, and a stop button 525 may be used to stop playback of the clips. A fast forward button 530 may be used to fast forward through a clip that is currently being presented, and a rewind button 535 may be used to rewind through the clip that is currently being presented. A skip forward button 540 may be used to stop playback of the clip that is currently being presented and to move forward to a next clip to be presented. Similarly, a skip backward button 545 may be used to stop playback of the clip that is currently being presented and to move backward to a previous clip to be presented.

In implementations where multiple clips for different subjects have been identified, the control set 510 may include additional buttons that enable navigation between the sets of clips for the different subjects. For example, the user interface 500 may be used in implementations where clips are identified for players included in a roster for a fantasy sports team of the user. In such an implementation, multiple clips may be identified for one or more of the included players. As a result, the control set 510 may include a next player button that enables navigation to a set of clips for a next player, and a previous player button that enables navigation to a set of clips for a previous player. Accordingly, the next player and previous player buttons may enable the user to bypass multiple clips corresponding to a particular player.

Figure 6:
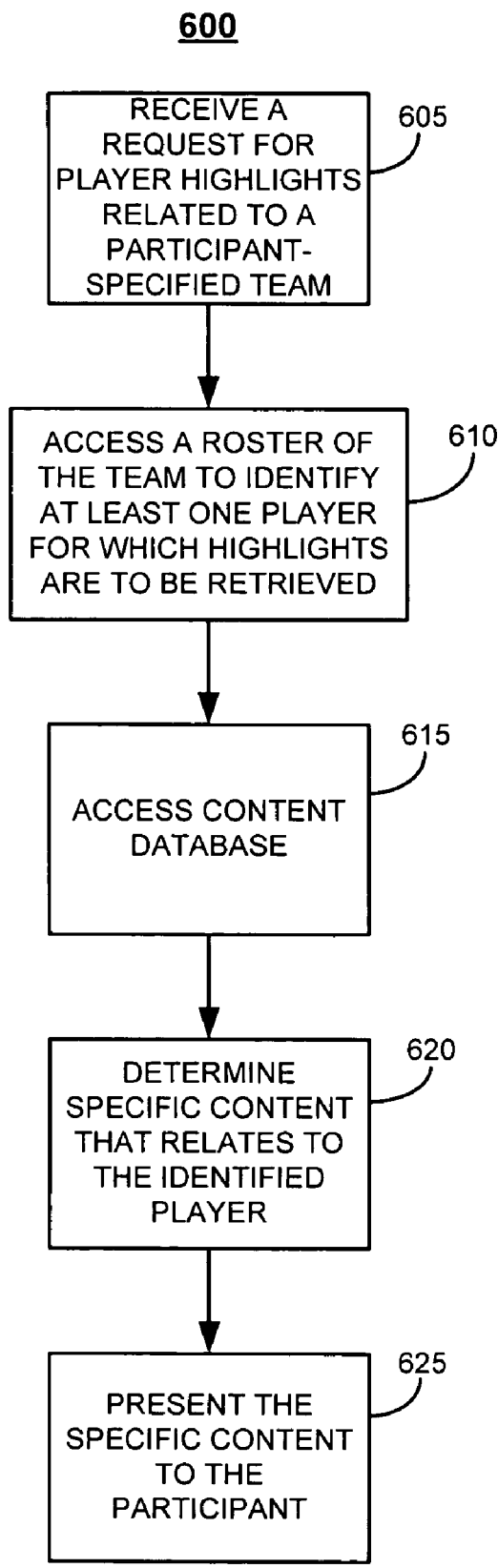
FIGS. 6, 7, and 8 are flow charts of processes for providing clips of content related to one or more pre-specified terms.

Referring to FIG. 6, a process 600 is used to identify clips highlighting players from a roster of a fantasy sports team. The process 600 may be executed by a clip retrieval system, such as the clip retrieval system 120 of FIG. 1 and the clip retrieval system 230 of FIG. 2. Various details of the process 600 are described in further detail above with respect to FIGS. 1-5.

The clip retrieval engine receives a request from a participant in a fantasy sports league for highlights of players included in the participant's team (605). The participant may generate the request by selecting a single option for retrieving the highlights, such as an icon or a link. Alternatively, the request may be generated automatically, for example, in response to a change in a roster of the participant's team.

The clip retrieval engine accesses a roster of the participant's fantasy sports team to identify at least one player for which highlights are to be retrieved (610). The roster may be the roster 210 of FIG. 2. The clip retrieval system also accesses a content database that has content relating to the identified player (615). The content database may be the content database 105 of FIG. 1 or the content database 220 of FIG. 2.

The clip retrieval engine determines specific content that relates to the identified player (620). The specific content may represent or may be included in a portion of the content included in the content database that is smaller than the larger pieces of content typically included in the content database. The specific content may be identified through analysis of the content included in the content database and metadata describing the included content. The specific content may include one or more clips highlighting the identified player. The specific content is presented to the participant (625). In one implementation, the specific content and/or the portion of the content that includes the specific content is extracted and presented to the participant, wherein the extracted content/portion is a strict subset of a larger piece of content from which the content/portion was identified and extracted. The one or more clips may be presented to the participant as individual clips, or as a single aggregation of the one or more clips.

Figure 7:
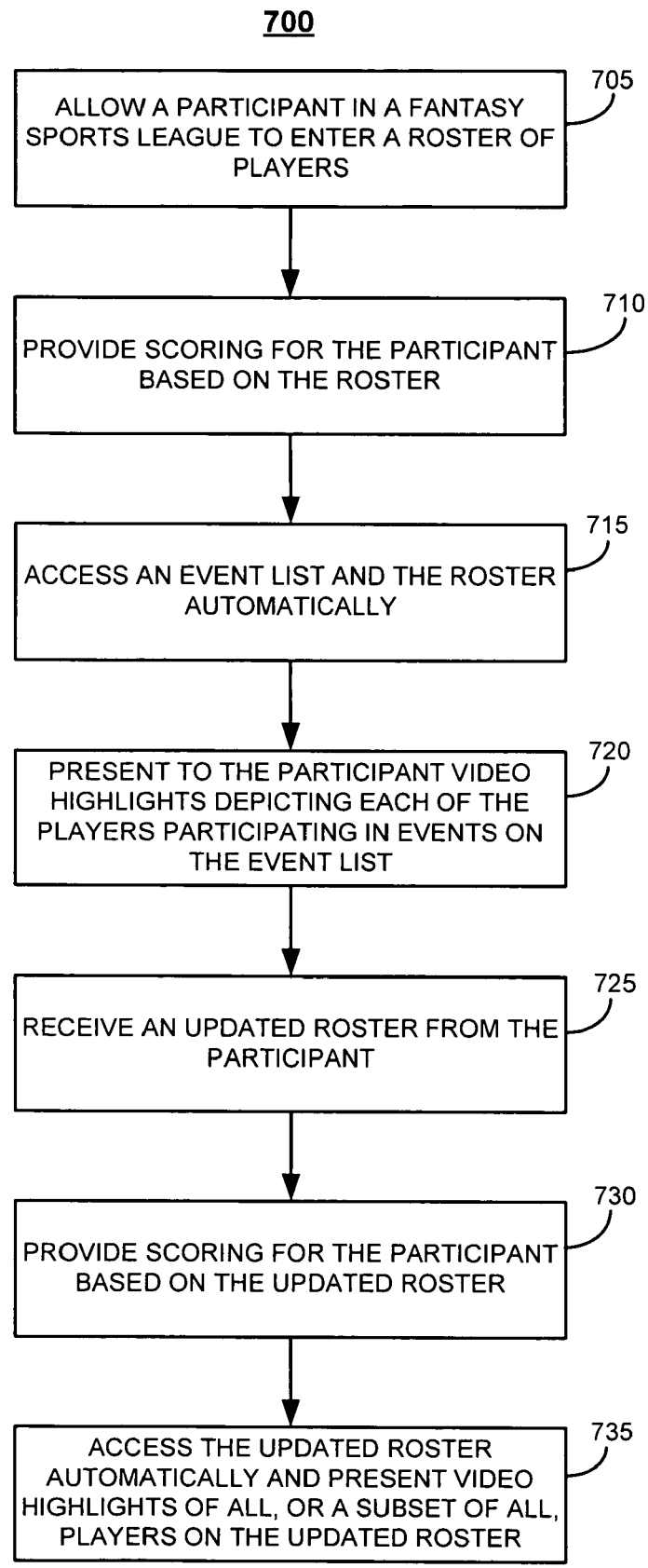

Referring to FIG. 7, a process 700 is used to identify clips highlighting players from a roster of a fantasy sports team. The process 700 is similar to the process 600 of FIG. 6. The process 700 may be executed by a clip retrieval system, such as the clip retrieval system 120 of FIG. 1 and the clip retrieval system 230 of FIG. 2. Various details of the process 700 are described in further detail above with respect to FIGS. 1-5.

The clip retrieval engine allows a participant in a fantasy sports league to enter a roster of players (705). The clip retrieval system provides scoring for the participant based on the roster (710). Typically, each of the players included in the roster is assigned a score based on a performance of the player in sporting events. For example, a player may receive a high score when the player scores points.

The clip retrieval engine accesses an event list and the roster automatically (715). The event list includes events for which a highlight may be identified. More particularly, video highlights depicting each of the players participating in events on the event list are identified, and the video highlights are presented to the participant (720). The video highlights may be presented to the participant, for example, as individual highlights, or as a single aggregation of the highlights.

The clip retrieval engine receives an updated roster from the participant (725), the updated roaster possibly including new players or deleting players. The participant may update the roster to trade one or more players from the roster, to change positions of the players included in the roster, or to change a starting lineup of the players. The clip retrieval engine provides scoring for the participant, as in operation 710, but based on the updated roster (730). In addition, the updated roster is accessed and video highlights of all, or a subset of all, of the players in the updated roster, including any new players added to the roster in the update, are presented to the participant (735).

Other implementations need not involve fantasy sports teams. For example, an individual may desire to search for a clip of a guitar solo by Eddie Van Halen within a concert video, to search for concert videos that include Eddie Van Halen as a guest performer for Bruce Springsteen, to search for an appearance of John Wayne on a horse within a movie, and to search for a scene including both John Neighbors and Andy Griffith within a television show. Clips from television shows that include a particular actor as a guest star may be retrieved. For example, clips showing Jack Klugman as a guest star on a recent television show may be retrieved. Movie previews or trailers that include a specific actor may be retrieved. Movie scenes that include one more actors may be retrieved. Clips from news programs that include one or more people or relate to one or more subjects may be identified. For example, clips of the President of the United States speaking with the Secretary General of the United Nations about a recent natural disaster may be identified.

Figure 8:
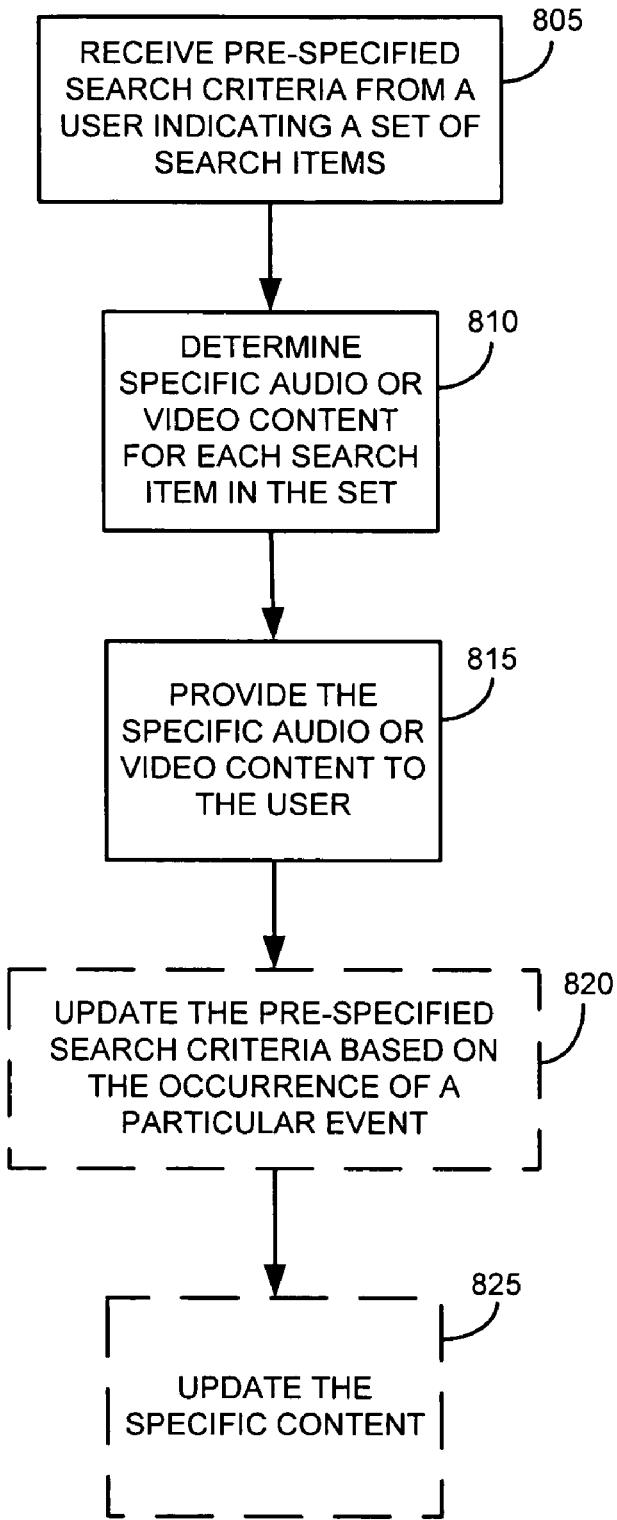

Referring to FIG. 8, a process 800 is used to identify and to present clips matching a set of pre-specified search criteria. The process 800 may be executed by a clip retrieval system, such as the clip retrieval system 120 of FIG. 1. Various details of the process 800 are described in further detail above with respect to FIGS. 1-5, as well as below. The description below describes the process 800 as being performed by a clip retrieval engine. However, another entity, or a group of entities, may perform the process 800 in other implementations.

The clip retrieval engine receives pre-specified search criteria from a user indicating a set of search items (805). The search items typically broadly indicate the items that the user desires the clip retrieval engine to search for. The search items desired may include clips of one or more types of content that match the pre-specified search criteria. For example, the search items desired may include clips highlighting athletes, clips from television programs or movies, or clips from news broadcasts. For example, a user may pre-specify search criteria including a team roster and a set listing the types of scoring plays. The clip retrieval engine may produce a set of search items that includes any roster member performing a listed scoring play. More specifically, the search terms may include, in a fantasy football implementation, search items for (1) the quarterback throwing a touchdown pass, (2) the wide receiver scoring a touchdown, (3) the kicker scoring a field goal, etc.

The user may specify the search criteria before the search items that match the search criteria are to be identified and retrieved. For example, in implementations where the search criteria specify one or more clips of football players, the user may specify the search criteria at the beginning of the football season, and the search criteria may be used to retrieve the clips after each game.

The clip retrieval engine determines specific content for each item in the set of search items (810). The specific content may be included in a content database that includes content relating to the search items, such as the content database 105 of FIG. 1. The specific content may include audio content or video content. The specific content may represent or may be included in a portion of a larger piece of content included in the content database. The specific content may be identified through analysis of the content included in the content database and metadata describing the included content.

The specific content is presented to the participant (815). In one implementation, the specific content and/or the portion of the content that includes the specific content is extracted from the content database and presented to the participant. The extracted content/portion may represent a strict subset of a larger piece of content from which the content/portion was identified and extracted. The one or more clips may be presented to the participant as individual clips, or as a single aggregation of the one or more clips.

The pre-specified search criteria may be updated based on the occurrence of a particular event (820). For example, in implementations where the search criteria specify a set of players from a fantasy sports teams for which clips are to be retrieved, the search criteria may be updated automatically in response to a change in the set of players. More particularly, if a user updates a roster of players included in a fantasy sports team, the search criteria may be updated automatically to remove search terms relating to players that have been removed from the roster and to add search terms relating to players that have been added to the roster. The search criteria also may be updated to reflect other user-specified changes to the roster, such as changes to player positions or to a starting lineup for the fantasy sports team. As another example, the search-criteria may be updated by the user.

The specific content may be updated (825). Updating the specific content may include determining specific content for each search item in the set of search items specified by the search criteria. The specific content may be updated in response to a request from the user for the specific content. The user may generate the request by selecting a single option for retrieving the specific content, such as an icon or a link. Alternatively, the request may be generated automatically, for example, in response to a change in a roster of the user's team. As another example, the specific content may be updated periodically on a recurring basis, such as, for example, after a game or at the end of every day. As yet another example, the specific content may be updated each time the search criteria are updated.

Figure 9:
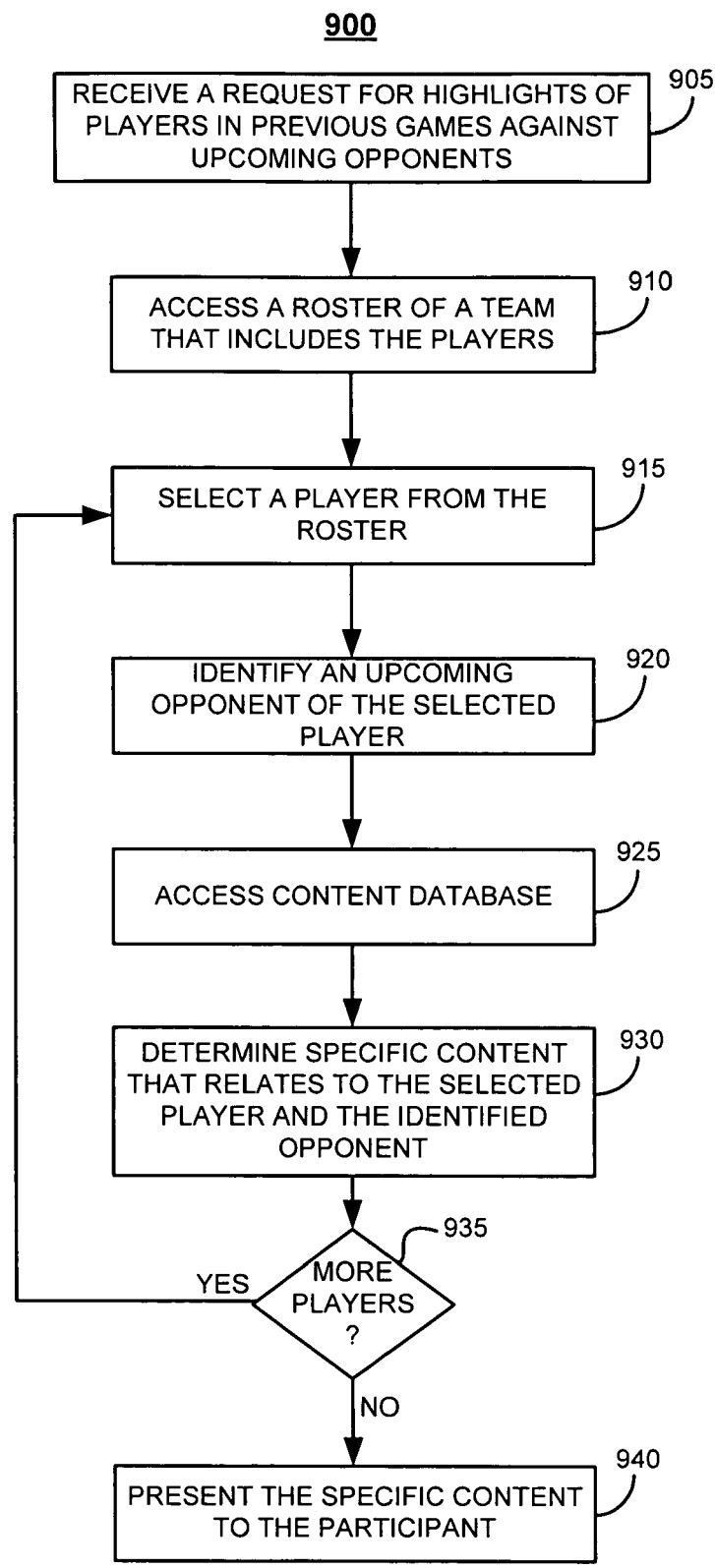
FIG. 9 is a flow chart of a process for providing clips of content relating to players included in a team from a fantasy sports league and relating to upcoming opponents of the players.

Referring to FIG. 9, a process 900 also is used to identify and to present clips matching a set of pre-specified search criteria. More particularly, the process 900 is used to identify and to present clips highlighting a previous performance of a player from a fantasy sports team roster against an upcoming opponent. The process 900 may be executed by a clip retrieval system, such as the clip retrieval system 120 of FIG. 1. Various details of the process 900 are described in further detail above with respect to FIGS. 1-5, as well as below. The description below describes the process 900 as being performed by a clip retrieval engine. However, another entity, or a group of entities, may perform the process 900 in other implementations.

The clip retrieval engine receives a request for highlights from a participant in a fantasy sports league (905). The requested highlights are highlights of players included in the participant's team in previous games against upcoming opponents. The request for highlights may be generated similarly to the request that is retrieved by the clip retrieval engine in the process 600 of FIG. 6.

The clip retrieval engine accesses a roster of a team that includes the players (910). The roster may be the roster 210 of FIG. 2. The clip retrieval engine accesses the roster to identify at least one player for which highlights are to be retrieved. For example, the clip retrieval engine selects a player from the roster (915). The clip retrieval engine identifies an upcoming opponent of the selected player (920). In one implementation, the upcoming opponent is identified from the roster, which includes indications of upcoming opponents for the included players. In another implementation, an indication of the upcoming opponent may be stored in a storage device that is accessible to the clip retrieval engine, such as the storage device 110 of FIG. 1. In another implementation, the clip retrieval engine may request and receive an indication of the upcoming opponent from a fantasy sports system that operates the fantasy sports league, such as the fantasy sports system 205 of FIG. 1.

The clip retrieval engine accesses a content database (925). The content database may be the content database 105 of FIG. 1 or the content database 220 of FIG. 2. The content database includes content that relates to the selected player and the identified opponent. The clip retrieval engine determines specific content included in the content database that relates to the selected player and the identified opponent, typically a team (930). The specific content may be identified through analysis of the content included in the content database and metadata describing the included content. For example, the analysis of the content or the metadata describing the content may identify the players represented by the content and the opponents against which the represented players are playing in the content. The specific content may include one or more clips highlighting the selected player playing against the identified opponent. For example, the specific content may highlight the performance of the selected player in a particular number of previous games against the identified opponent.

The clip retrieval engine determines whether specific content is to be retrieved for other players included in the roster (935). In one implementation, the clip retrieval engine may determine whether specific content has been retrieved for all players included in the roster. If not, then the clip retrieval engine selects another player from the roster (915), identifies an upcoming opponent of the selected player (920), accesses the content database (925), and determines specific content included in the content database that relates to the selected player and the identified opponent (930).

If the clip retrieval engine determines that specific content is not to be retrieved for other players included in the roster, then the clip retrieval engine presents the specific content to the participant (940). The specific content identified for each of the players may be presented to the participant as individual clips, or as a single aggregation of the one or more clips. The participant may use the specific content to determine how the players have performed historically against their upcoming opponents. Furthermore, the participant may use the specific content, for example, to determine whether one or more of the players should be included in a starting lineup for the team in games against the upcoming opponents, or whether one or more of the players should be removed from the team roster entirely before the games against the upcoming opponents. In another implementation of the process 900, the specific content highlighting a player included in a roster may be presented to the participant when the specific content is identified, instead of after specific content has been identified for all players. Further, the process 900 may be modified to provide clips for a selected player against multiple upcoming opponents. Additionally, the request may be received (905) at a variety of points in the process 900, such as, for example, after selecting a player (915).

A user may share the identified clips with other users. For example, the user may share ten clips highlighting players from the user's fantasy sports team with other users of the fantasy sports league. The user may share the clips by providing a link that may be used to access the clips. More particularly, the other users may stream the clips from a location identified by the link. Alternatively or additionally, the user may provide the actual clips to the other users.

Instead of identifying and providing all clips that match terms from a terms list, a subset of the clips may be provided. For example, a particular number of clips that best match one or more terms from the terms list may be provided. A user may thus create, for example, a personalized or customized "Top Five Plays" clip set, or a "Top Ten TV Clips" clip set from one or more shows or games. The terms list may include subject matter or characteristics of clips to be retrieved such that the retrieved clips closely match interests of a user that specified the terms list.

The techniques described above may be used to provide clips from a variety of content, such as sporting events, news programs, television programs, concert videos, songs, and albums. Below is a non-exhaustive list of specific examples of applications of the techniques described above. At least some of these examples are also discussed earlier. In addition to the examples listed below, the described techniques may be applied in other manners to retrieve clips of audio or video content.

In fantasy sports implementations, for example, one or more of the following features may be provided. For example, a user has the option to request, with one click (or a small number of clicks, or in another simplified and streamlined fashion), custom highlights of players on a roster of a personal fantasy team of the user, when such players achieve a scoring milestone. The scoring milestone may be user-defined or defined in league rules, and may be from a recent game. For example, in fantasy football implementations, a player may achieve a scoring milestone when the player records any of the following: a touchdown, a sack, a running play greater than a threshold number of yards, a passing play greater than a threshold number of yards, an interception; a 2-point conversion, a fumble, or a play in the "red zone."

The roster of players may be monitored, and changes to the roster (e.g., via trades, free agent moves, etc.) may be detected automatically. The highlights that are presented may be changed in real time in response to the roster changes. The user may be allowed to set defaults and/or manually select additional players (e.g., active players only or bench players too) and add any available free agents who scored more than a particular number of fantasy points recently, such as in the latest week (or more than a particular number of points in the aggregate this season, etc.).

Duplicative highlights may be avoided. For example, if Peyton Manning and Marvin Harrison are both on the user's fantasy football roster, touchdown throws from Manning to Harrison could be displayed only once (rather than twice, once as a Manning related highlight and once as a Harrison related highlight).

In a draft guide implementation, video highlights that include audio commentary, statistics, and/or analysis of fantasy players may be provided to a user to inform a user's selection of players during a draft of the fantasy players. In draft guide implementations, for example, highlights may be provided for the overall top 200 players, the top 20 players in each position, the top 20 sleepers (e.g., underrated players), the top 20 busts (e.g., overrated players), the top 20 rookies, or the top 20 bounce back players (e.g., players that are recovering from an injury or players that had a bad season). These highlights may be available prior to, and during, the draft.

In addition to highlights of specific players, more general highlights including audio commentary, statistics, and/or analysis of a league in which the players participate may be provided. The highlights may provide fantasy draft day preparation strategies (e.g., strategies for auction style drafts or straight drafts). The highlights may provide answers to typical questions (e.g., the top 10 toughest questions to answer in fantasy sports), or team-by-team fantasy analysis with projected lineups and depth charts. In addition, the highlights may indicate historical or projected statistic leaders, either by position or by scoring category (e.g., touchdown receptions).

In a fantasy sports assistant implementation, information that may impact fantasy sports decisions may be provided to a user. The fantasy sports assistant may include an analytical and sortable video tracking tool for providing audio or video content to the user. The audio or video content may include information describing injuries, transactions, or position battles. In addition, the content may provide weekly forecasts for the players on the user's roster. The weekly forecast for a player may include highlights of the player in the player's most recent games against an upcoming opponent to show how the player has performed against the upcoming opponent historically. The content also may include highlights of players on customized watch lists, which allow a user to set defaults and/or manually select additional players (e.g., active players only or bench players too) and add any available free agents who scored more than a particular number of fantasy points this latest week (or more than a particular number of points in the aggregate this season, etc.). The content also may include newsbreakers, which are pieces of content highlighting breaking news regarding players on the user's roster, or players included in the user's customized watch list. The fantasy sports assistant may allow a user to specify the content to be received, or to otherwise filter available content.

In a fantasy scouting report implementation, a visual comparison of an active lineup of a user's team and an opponent's active lineup may be provided to the user. Conversely, the user may receive a post-week highlight reel comparing the performance of the user's team against the opponent's team during the previous week. The comparison may be position by position (e.g., QB vs. QB; RB vs. RB; WR vs. WR; TE vs. TE; PK vs. PK; and TmD vs. TmD in fantasy football implementations).

In a wireless fantasy roster management implementation, a user may be enabled to manage his fantasy roster from a wireless device, such as a cell phone or a personal digital assistant (PDA). As a result, the user may be enabled to make last minute changes to the roster, for example, in response to an injury alert (e.g., your starting QB is hurt and not expected to play, do you want to change QB's, Y/N?) Such implementations also may allow manual changes, for example, if the user has been unable to access a desktop or laptop personal computer to change the roster.

The above described features may be provided in implementations for any fantasy sport, including football, basketball, baseball, NASCAR, and hockey. In addition, the above described features may be included in implementations for any level of a sport, including college leagues, professional leagues, minor leagues, international leagues (e.g., NFL Europe), men's leagues, and women's leagues. Furthermore, the above described features may be provided in implementations for sports outside of a fantasy sports league. In other words highlights of players not included in a fantasy sports roster may be provided.

Similar features may be provided in implementations in other categories of content beyond sports. For example, highlights of entertainment (e.g., music, television programs, movies) or news may be provided.

In entertainment implementations, highlights of one or more entertainers, or of one or more pieces of entertainment content, may be presented to a user. For example, the user may be a music fan who wants to see Eddie Van Halen guitar solos only, as a portion of concert footage or music videos. As another example, the user may be a music fan who wants to see clips only of songs when Eddie Van Halen is on stage as a guest performer with Bruce Springsteen in concert.

The user may be a music fan who wants to see all videos or hear all songs from a list of favorite artists, or from a list of recently selected or searched artists. More particularly, the user may want to see all videos from a particular artist or set of artists (e.g. Janet Jackson, Michael Jackson) that include a group dance scene. The user also may want to see all Aerosmith videos that include an appearance by Alicia Silverstone. The user may be a music fan who wants to see all videos or hear all songs from a preferred genre of music, or from a list of recently selected or searched genres. In each of the above examples, selection may be limited by the user to newly released videos and songs.

The user also may be a television fan who wants to see all clips from last night's (or last week's) TV shows if and when Jack Klugman was a guest star on a current show (as opposed to entire reruns of Quincy or The Odd Couple). The user may want to see all clips from last night's (or last week's) shows that are on a list of favorite shows, or on a list of recently selected or searched shows. The user may want to see all clips from shows that involve one character doing something specific (e.g. all of Kramer's entrances on Seinfeld, all of Jennifer Garner's costumes and wigs on Alias).

The user may want to see movie trailers or clips in which a specific actor appears. The user also may want to see movie trailers or clips directed by a specific director, or movie trailers or clips from a specific genre. The user also may want to see movie scenes where two or more actors appear on camera at the same time. The user may want to search for an appearance of John Wayne on a horse within a movie, or to search for a scene including both John Neighbors and Andy Griffith within a television show. The user may want to search for all movie scenes where Jack Nicholson delivers a monologue.

The user may be a video game fan that wants to see all video clips of tips, cheats and players demonstrating moves from one or more games on a list of favorite games, or a list of recently selected or searched games. The user also may want to see all clips that include two or more specific characters from a game as opponents.

In news implementations, highlights of news relating to one or more people or events may be presented to a user. For example, a user may want to view clips of President Bush being shown on the current news speaking with Kofi Annan about relief for victims of natural disasters, such as a tsunami. An alert of the clips may be sent to the user automatically when the clips are identified.

A variety of features may be provided in one or more of the implementations described in this document. The implementations may relate, for example, to sports, entertainment, news, or other types of content. Such features may include, for example, one or more of the following.

Highlights of audio and/or video content may be provided to a user. The highlights may be provided to the user regardless of a platform or operating system of a computer system used by the user.

Based on current or past requests, a customized and personalized set of clips (e.g., a personalized set of selected from the most popular clips from last night's, or last week's, game(s), TV show(s), movie(s), or news) may be sent to a user. In other words, personalized TV, news, sports, or movie clips may be provided to the user. A system or a user may determine the personalized criteria, and the personalized set of clips may be provided automatically.

Requested materials may be sent to a user automatically, without any action by the user. For example, an alert of the requested material, such as a link to the requested fantasy highlights, custom news highlights, custom music highlights, or custom movie highlights, may be sent to the user.

For any feature based on multiple persons or multiple events, duplicates may be avoided. For example, if Peyton Manning and Marvin Harrison are both on a user's fantasy football roster, touchdown throws from Manning to Harrison could be displayed only once (rather than twice, once as a Manning related highlight and once as a Harrison related highlight). Similarly, if Alicia Keys and Usher are both on the users favorite artists list or recently selected/searched list, the video for "My Boo," which includes both artists, would be displayed only once in the highlights.

The resulting audio and/or video may be integrated with other data and/or text when being presented on screen. For example, a player's stats may be displayed as text while highlights of the player are displayed as video. As another example, metadata about a song, such as the singer, songwriter, or title of the song, may be presented while a video of the song is displayed.

The highlights may be provided to the user as one stream or multiple streams. Alternatively or additionally, the highlights may be provided as one or more downloads. In either case, the highlights may be presented to the user as seamless as possible such that the user may not notice boundaries between the individual highlights.

A user may be enabled to select or create a personal playlist, for example, of a particular number of favorite plays from last weekend's games. The user may be enabled to share such personal playlists. For example, the user may send the personal playlist to his friends to enable the friends to watch the user's custom highlight reel. The playlist could be sent via a link, and could be streamed from a central source, possibly as one stream.

A user (and/or a playback system or default settings) may determine an order of playback for highlights. For example, the highest scoring player (in terms of fantasy points) may be shown first, followed by the other players in descending order of points scored. Similarly, songs from artists at the top of the user's personalized favorites list may be played first. As another example, video games with the greatest number of demo video clips may be shown first.

A user (and/or a playback system or default settings) also may reorder the highlights. For example, instead of watching all of any one player's highlights, then all of another player's highlights, the user may integrate the various players' highlights together to display the highlights in a different order. For example, longer scoring touchdowns by any player may be shown first, and shorter touchdown runs may be shown last. Similarly, movie clips of multiple actors may be shown in descending order based on release date of the movies. As another example, TV show clips may be shown in order based on the time when the show originally aired.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method of providing a fantasy-sports-league, the method comprising:
    receiving, from a participant in the fantasy-sports-league, a roster of players;
    enabling presentation, to the participant, of a first score based on the roster of players;
    accessing an events list and the roster of players automatically;
    using the events list to identify video highlights that depict each of the players in the roster of players participating in at least one event on the events list;
    enabling presentation, to the participant, of the identified video highlights of all the players on the roster of players;
    receiving, from the participant, an updated roster of players;
    enabling presentation, to the participant, of a second score based on the updated roster of players;
    accessing the events list and the updated roster of players automatically;
    using the events list to identify video highlights that depict each of the players in the updated roster of players participating in at least one event on the events list; and
    enabling presentation, to the participant, of the identified video highlights of all the players on the updated roster of players,
    wherein using the events list to identify the video highlights that depict each of the players in the roster of players participating in the at least one event on the events list comprises using the events list to identify video highlights that show each of the players in the roster of players performing at least one activity characterized as an event in the events list, and
    wherein each activity characterized as an event in the events list is assigned a point value for calculating a score for player rosters.

2. The method of claim 1, further comprising determining the first score based on the roster of players.

3. A method of presenting video highlights of interest from within one or more sporting events, the method comprising:
    accessing a predefined group of events, each event in the group of events corresponding to an activity that occurs during a sporting event, wherein each activity characterized as an event is assigned a point value for calculating a score for player rosters;
    receiving a selection of a subset of the predefined group of events;
    accessing a user-specified set of game players of interest to a user;
    for each player in the user-specified set of game players, using the received subset of the predefined group of events as a basis for identifying video content showing the game player participating in at least one activity characterized as an event included in the received subset of the predefined group of events, the video content being identified from among video relating to one or more game instances; and
    enabling presentation, to the user, of the identified video content.

4. The method of claim 3 wherein accessing a user-specified set of game players comprises accessing a user-specified roster.

5. The method of claim 3 further comprising enabling the user to modify the predefined group of events.

6. The method of claim 3 wherein the video content is identified based at least on a comparison between the at least one event included in the received subset of the predefined group of events and closed-captioning text associated with the video relating to one or more game instances.

7. The method of claim 3 wherein the video content is identified based at least on a comparison between the at least one event included in the received subset of the predefined group of events and indicia identified through manual review and indexing of the video relating to one or more game instances.

8. The method of claim 3, wherein receiving the selection of the subset of the predefined group of events comprises receiving the selection of the subset of the predefined group of events from the user, the predefined group of events consisting of a set of events and the subset of the predefined group of events being a subset of the set of events.

9. The method of claim 3, wherein activities characterized as events in the predefined group of events include one or more of a touchdown, a field goal, an extra point, a two-point conversion, a safety, a play in which at least a threshold number of yards were gained, a turnover, and a sack.

10. A method of providing video highlights for a fantasy sports-league team roster, the method comprising:
    accessing a roster for a team specified by a participant in the fantasy sports-league;
    accessing video content that includes content relating to at least one player on the roster;
    accessing an events list, wherein the events list consists of events that impact scoring of the team specified by the participant in the fantasy sports-league;
    using the events list to search the video content for content relating to the at least one player participating in at least one event from the events list;
    identifying, based on the searching, a portion of the video content that is smaller than the video content, the identified portion of the video content depicting the at least one player participating in the at least one event from the events list; and
    enabling presentation of the portion of the video content to the participant.

11. The method of claim 10 wherein:
    identifying the portion of the video content comprises extracting the portion of the video content from the video content; and enabling presentation of the portion of the video content to the participant comprises enabling presentation of only the extracted portion of the video content to the participant.

12. The method of claim 10, wherein using the events list to search the video content for content relating to the at least one player participating in at least one event from the events list includes using the events list to search the video content for content showing the at least one player participating in an activity characterized as an event in the events list.

13. The method of claim 12, wherein activities characterized as events in the events list include one or more a touchdown, a field goal, an extra point, a two-point conversion, a safety, a play in which at least a threshold number of yards were gained, a turnover, and a sack.

14. The method of claim 12, wherein each activity characterized as an event in the events list is assigned a point value for calculating a score for player rosters.

15. The method of claim 10, wherein:
accessing the video content that includes the content relating to the at least one player on the roster comprises accessing video content that includes content relating to a subset of players on the roster, the roster of players consisting of a set of players and the subset of players being a subset of the set of players;
accessing the events list comprises accessing a subset of events, the events list consisting of a set of events and the subset of events being a subset of the set of events;
using the events list to search the video content for the content relating to the at least one player participating in the at least one event from the events list comprises using the events list to search the video content for content relating to each player in the subset of players participating in at least one event from the subset of events; and
identifying the identified portion of the video content depicting the at least one player participating in the at least one event from the events list comprises identifying the identified portion of the video content depicting each player in the subset of players participating in at least one event from the subset of events.

16. The method of claim 15, wherein:
accessing the video content that includes the content relating to the subset of players on the roster comprises:
enabling presentation, to the participant, of the roster,
receiving, from the participant, the subset of players, and storing the subset of players; and
accessing the subset of event comprises:
enabling presentation, to the participant, of the events list,
receiving, from the participant, the subset of events, and storing the subset of events.

17. A method of presenting player highlights, the method comprising:
receiving, from a participant in a fantasy-sports league, a request for player highlights against upcoming opponents related to a participant-specified team roster;
in response to receiving the request, identifying at least one player on the participant-specified team roster;
identifying at least one upcoming opponent of the identified player;
accessing at least one video source having content relating to the identified player and the identified opponent;
determining specific content within the video source that relates to the identified player and the identified opponent; and
enabling presentation of the specific content to the participant.

18. The method of claim 17, wherein identifying the at least one player on the participant-specified team roster comprises identifying a subset of players on the participant-specified team roster, the participant-specified team roster consisting of a set of players and the subset of players being a subset of the set of players.

19. The method of claim 18, further comprising accessing a subset of events of an events list, the events list consisting of a set of events and the subset of events being a subset of the set of events, wherein determining the specific content within the video source that relates to the identified player and the identified opponent comprises determining specific content within the video source that relates to the subset of players, the identified opponent, and the subset of events.

20. The method of claim 19, wherein:
identifying the subset of players on the participant-specified team roster comprises:
enabling presentation, to the participant, of the participant-specified team roster,
receiving, from the participant, the subset of players, and storing the subset of players; and
accessing the subset of events comprises:
enabling presentation, to the participant, of the events list,
receiving, from the participant, the subset of events, and storing the subset of events.

21. A method of presenting player highlights, the method comprising:
receiving, from a participant in a fantasy-sports league, a request for player highlights related to a participant-specified team roster;
in response to receiving the request, identifying at least one player on the participant-specified team roster;
accessing at least one video source having content relating to the identified player;
accessing an events list, wherein the events list consists of events that impact scoring of the participant-specified team roster;
using the events list to determine specific content within the video source that relates to the identified player and at least one event on the events list; and
enabling presentation, to the participant, of the specific content relating to the identified player and the at least one event on the events list.

22. The method of claim 21 wherein receiving a request comprises receiving a single click request from the participant.

23. The method of claim 21 further comprising:
receiving, from the participant, another player identity not on the participant-specified team roster;
accessing at least one video source having content related to the other player identity;
accessing the events list;
using the events list to determine specific content within the video source that relates to the other player identity and at least one event on the events list; and
enabling presentation, to the participant, of the specific content relating to the other player identity and the at least one event on the events list.

24. The method of claim 21 further comprising using the events list to determine and enabling presentation of specific content relating to at least one other player on the roster, such that the participant is presented with specific content relating to multiple players on the roster and at least one event on the events list.

25. The method of claim 24 further comprising compiling the specific content for each of the multiple players on the roster and the at least one event on the events list into a single object such that the participant is presented with a single object including an aggregation of specific content relating to all of the multiple players on the roster and the at least one event on the events list.

26. The method of claim 25 wherein compiling comprises positioning together the specific content that relate to a common type of event occurring in a fantasy-sports league.

27. The method of claim 21 further comprising identifying an upcoming opponent of the at least one player, and wherein the determined specific content further relates to the identified upcoming opponent and includes content depicting the at least one player playing against the identified upcoming opponent.

28. The method of claim 25, wherein a number of the specific content relating to all of the multiple players on the roster and the at least one event on the events list is less than a threshold number.

29. The method of claim 21, wherein using the events list to determine the specific content within the video source that relates to the identified player and the at least one event on the events list comprises using the events list to determine specific content within the video source that shows the identified player performing an activity characterized as an event in the events list.

30. The method of claim 29, wherein activities characterized as events in the events list include one or more of a touchdown, a field goal, an extra point, a two-point conversion, a safety, a play in which at least a threshold number of yards were gained, a turnover, and a sack.

31. The method of claim 29, wherein each activity characterized as an event in the events list is assigned a point value for calculating a score for player rosters.

32. The method of claim 21, wherein:
identifying the at least one player on the participant-specified team roster comprises identifying a subset of players on the participant-specified team roster, the participant-specified team roster consisting of a set of players and the subset of players being a subset of the set of players;
accessing the events list comprises accessing a subset of events, the events list consisting of a set of events and the subset of events being a subset of the set of events; and
using the events list to determine the specific content within the video source that relates to the identified player and the at least one event on the events list comprises using the events list to determine the specific content within the video source that relates to the subset of players and at least one event in the subset of events.

33. The method of claim 32, wherein:
identifying the subset of players on the participant-specified team roster comprises:
enabling presentation, to the participant, of the participant-specified team roster,
receiving, from the participant, the subset of players, and
storing the subset of players; and
accessing the subset of events comprises:
enabling presentation, to the participant, of the events list,
receiving, from the participant, the subset of events, and
storing the subset of events.

* * * * *